(12) United States Patent
Qi et al.

(10) Patent No.: US 11,320,574 B2
(45) Date of Patent: May 3, 2022

(54) LIGHT GUIDE PLATE, BACKLIGHT MODULE AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Yonglian Qi, Beijing (CN); Xue Dong, Beijing (CN); Huijuan Wang, Beijing (CN); Zezhou Yang, Beijing (CN); Hebin Zhao, Beijing (CN); Lianjie Qu, Beijing (CN); Shuai Liu, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 522 days.

(21) Appl. No.: 16/332,263

(22) PCT Filed: Sep. 14, 2018

(86) PCT No.: PCT/CN2018/105671
§ 371 (c)(1),
(2) Date: Mar. 11, 2019

(87) PCT Pub. No.: WO2019/056985
PCT Pub. Date: Mar. 28, 2019

(65) Prior Publication Data
US 2021/0333459 A1 Oct. 28, 2021

(30) Foreign Application Priority Data
Sep. 19, 2017 (CN) .......................... 201721199932.9

(51) Int. Cl.
F21V 8/00 (2006.01)
G02F 1/1335 (2006.01)
G02F 1/13357 (2006.01)

(52) U.S. Cl.
CPC ......... *G02B 6/0003* (2013.01); *G02B 6/0051* (2013.01); *G02B 6/0053* (2013.01);
(Continued)

(58) Field of Classification Search
CPC ................ G02B 6/0003; G02B 6/0043; G02F 1/133614; G02F 1/133602;
(Continued)

(56) References Cited

U.S. PATENT DOCUMENTS 9,146,419 B1 * 9/2015 Anandan .............. G02B 6/0036
2006/0104084 A1 5/2006 Amemiya et al.
(Continued)

FOREIGN PATENT DOCUMENTS

CN 102563457 A 7/2012
CN 102628580 A 8/2012
(Continued)

OTHER PUBLICATIONS

Yagi, 2012, WO-2012141094-A1, English (Year: 2012).*
International Search Report and Written Opinion for Application No. PCT/CN2018/105671, dated Dec. 3, 2018, 11 Pages.

*Primary Examiner* — Jong-Suk (James) Lee
*Assistant Examiner* — James M Endo
(74) *Attorney, Agent, or Firm* — Brooks Kushman P.C.

(57) ABSTRACT

A light guide plate, a backlight module and a display device are provided. A plurality of blind holes is arranged at a surface of the light guide plate; the blind hole is filled with a light-converting unit; the light-converting unit includes an accommodating cavity made of a light-transmitting material, and a light-converting material located in the accommodat-
(Continued)

ing cavity; and a gap is between an outer wall of the accommodating cavity and an inner wall of the blind hole.

17 Claims, 2 Drawing Sheets

(52) U.S. Cl.
CPC ..... *G02B 6/0073* (2013.01); *G02F 1/133603* (2013.01); *G02F 1/133606* (2013.01); *G02F 1/133614* (2021.01)

(58) Field of Classification Search
CPC .. G02F 1/133606; F21K 9/65; F21V 2200/30; F21V 9/30; F21V 13/14
See application file for complete search history.

(56) References Cited

U.S. PATENT DOCUMENTS

| 2009/0086508 | A1* | 4/2009 | Bierhuizen | G02B 6/0021 362/617 |
| 2009/0179548 | A1* | 7/2009 | Lai | G02B 6/0038 313/498 |
| 2010/0079980 | A1* | 4/2010 | Sakai | G02B 6/0016 362/97.1 |
| 2010/0118545 | A1* | 5/2010 | Ijzerman | G02B 6/0073 362/296.01 |
| 2010/0244058 | A1* | 9/2010 | Weng | G02F 1/133603 257/88 |
| 2011/0149594 | A1* | 6/2011 | Terajima | G02B 6/0021 362/606 |
| 2011/0164402 | A1* | 7/2011 | Kang | G02F 1/133606 362/97.2 |
| 2011/0176328 | A1* | 7/2011 | Anandan | G02F 1/133606 362/606 |
| 2012/0051093 | A1* | 3/2012 | Kanade | G02B 6/0041 362/629 |
| 2012/0140448 | A1 | 6/2012 | Nagayoshi et al. | |
| 2012/0275139 | A1* | 11/2012 | Chen | G02B 6/0025 362/97.2 |
| 2014/0334152 | A1* | 11/2014 | Ho | H01L 33/508 362/249.02 |
| 2015/0097198 | A1* | 4/2015 | Illek | H01L 33/644 257/88 |

FOREIGN PATENT DOCUMENTS

| CN | 206193278 U | 5/2017 | |
| CN | 107166254 A | 9/2017 | |
| CN | 207133458 U | 3/2018 | |
| KR | 20170103421 A | 9/2017 | |
| WO | WO-2012141094 A1 * | 10/2012 | ....... G02F 1/133605 |

* cited by examiner

US 11,320,574 B2

LIGHT GUIDE PLATE, BACKLIGHT MODULE AND DISPLAY DEVICE

CROSS-REFERENCE TO RELATED APPLICATIONS

This application is the U.S. national phase of PCT Application No. PCT/CN2018/105671 filed on Sep. 14, 2018, which claims priority to Chinese Patent Application No. 201721199932.9 filed on Sep. 19, 2017, which are incorporated herein by reference in their entireties.

TECHNICAL FIELD

The present disclosure relates to the field of display technology, and in particular to a light guide plate, a backlight module and a display device.

BACKGROUND

With the development of TFT-LCD (Thin Film Transistor Liquid Crystal Display) technology and advances in industrial technology, the production cost of a liquid crystal display is progressively decreasing, and the manufacturing process is becoming more and more perfect. TFT-LCDs have replaced cathode ray tube displays to become a mainstream technology in the field of flat panel display, and have become ideal display devices for consumers. However, a backlight of the liquid crystal display in the related art cannot effectively achieve a wide color gamut.

SUMMARY

In a first aspect, a light guide plate is provided. A plurality of blind holes is arranged at a first surface of the light guide plate. Each of the plurality of blind holes is filled with a light-converting unit. The light-converting unit comprises an accommodating cavity made of a light-transmitting material, and a light-converting material located in the accommodating cavity. A gap is between an outer wall of the accommodating cavity and an inner wall of each blind hole.

Optionally, the light-converting material comprises at least one of a quantum dot material and a fluorescent material.

Optionally, a diameter of each blind hole is in a range of 100 µm to 1000 µm, a depth of each blind hole is in a range of 100 µm to 1000 µm, and a diameter of the accommodating cavity is smaller than 100 µm.

Optionally, the light-transmitting material comprises a glass or a transparent resin.

Optionally, a plurality of diffusion dots is arranged on a light-entering surface of the light guide plate.

Optionally, the blind hole is cylinder-like, and each accommodating cavity is truncated cone-like.

Optionally, a refractive index of a medium filled into the gap is less than a refractive index of the light-converting material.

Optionally, the medium in the gap is air.

Optionally, the outer wall of the accommodating cavity is an inclined surface.

Optionally, the first surface is a light-exiting or a light-entering surface of the light guide plate.

In a second aspect, a backlight module is provided by embodiments of the present disclosure, including the light guide plate as described above, and further including a light source arranged on a side of the light-entering surface of the light guide plate and exciting the light-converting material to emit light.

Optionally, the light source comprises a LED array, and each LED in the LED array corresponds to at least one light-converting unit.

Optionally, the LED array is arranged on a transparent substrate, and a light reflecting layer is arranged on a side of the transparent substrate facing away from the LED array.

Optionally, further including: a light-shielding metal pattern located on the first surface of the light guide plate, in which an orthographic projection of the light-shielding metal pattern onto the first surface overlaps with an orthographic projection of the light-converting unit onto the first surface.

Optionally, the backlight module further includes at least one of a scattering film and a brightness enhancement film, and the scattering film and the brightness enhancement film are both located on a side of the light-shielding metal pattern facing away from the first surface of the light guide plate.

Optionally, each LED in the LED array is a blue LED.

In third aspect, a display device is provided by embodiments of the present disclosure, including the backlight module as described above.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make objectives, technical solutions and advantages of the embodiments of the present disclosure clearer, technical solutions of the embodiments of the present disclosure will be clearly and completely described below in conjunction with drawings of the embodiments of the present disclosure.

The liquid crystal display in related art generally realizes a dynamically adjustable backlight by using a direct-type backlight source. A plurality of LEDs included in the direct-type backlight source is divided into multiple regions, and switches of the LEDs in different regions are respectively controlled, so as to realize the dynamically adjustable backlight. However, the direct-type backlight source in the related art cannot effectively achieve a wide color gamut.

In view of the problem that the direct-type backlight source in the related art cannot effectively achieve the wide color gamut, a light guide plate, a backlight module and a display device are provided according to some embodiments of the present disclosure, which can enable the display device to have the wide color gamut and the dynamically adjustable backlight.

Figure 1:
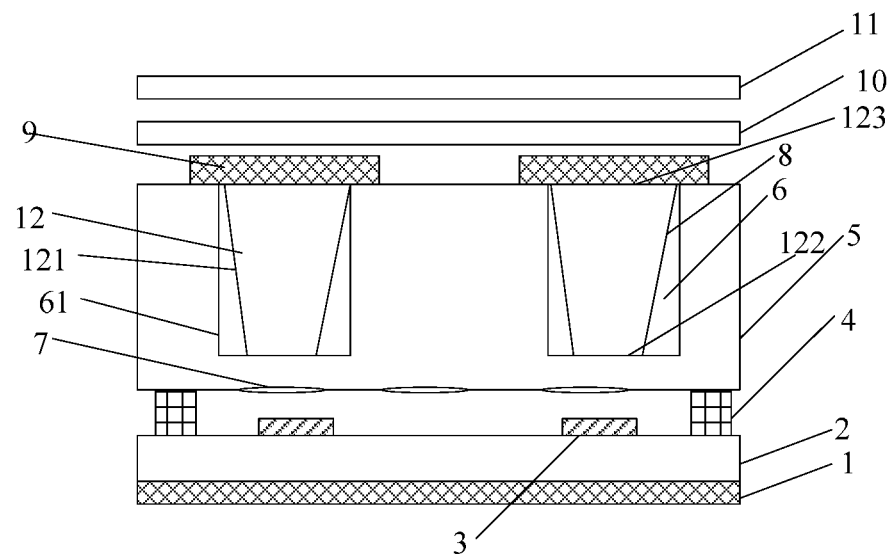
FIG. 1 is a schematic structural diagram of a backlight module according to at least one embodiment of the present disclosure.

As shown in FIG. 1, a light guide plate is provided according to at least one embodiment of the present disclosure. A plurality of blind holes 6 is arranged at a surface of the light guide plate 5. The blind hole 6 is filled with a light-converting unit. The light-converting unit includes an accommodating cavity 12 formed by a light-transmitting material, and a light-converting material 8 located in the accommodating cavity 12.

In the embodiment, a plurality of blind holes 6 is arranged at the surface of the light guide plate 5, the blind hole 6 is filled with the light-converting unit, and the light-converting unit includes an accommodating cavity 12 formed by a light-transmitting material, and a light-converting material 8 located in the accommodating cavity 12. In the case that a light source of the backlight module emits light, the light-converting material 8 may be excited by the emitted light to emit light. Compared with directly using the LED as the light source, a wide color gamut of the backlight module can be realized by using the light emitted from the light-converting material 8 as a light source.

Figure 2:
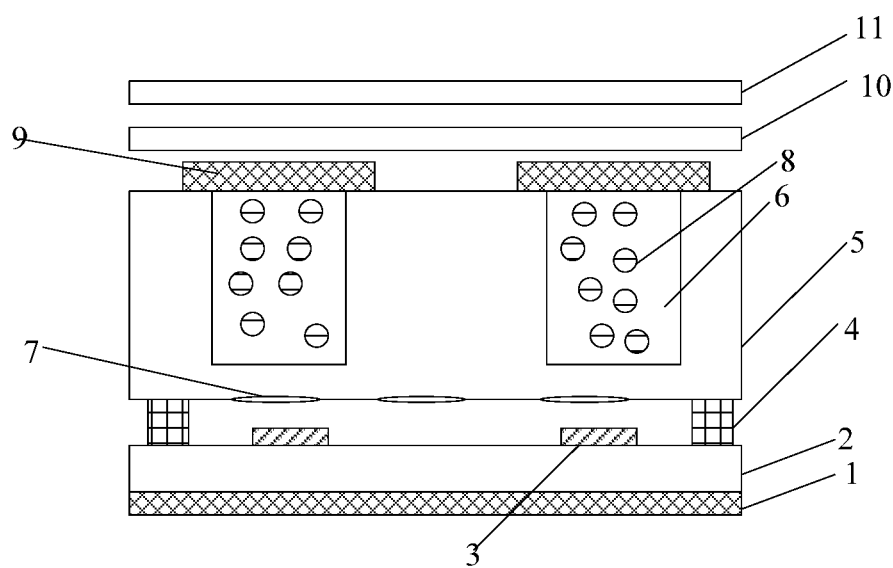
FIG. 2 is a schematic structural diagram of a backlight module according to at least one embodiment of the present disclosure.

As shown in FIG. 2, the light guide plate is provided according to at least one embodiment of the present disclosure. There is no gap between the light-converting unit and the blind hole 6. In the case that the light-transmitting material is made of glass, since the refractive index of the light guide plate 5 and the refractive index of the glass are similar or even substantially the same, a total reflection may not occur to the light emitted from the light-converting unit inside the light guide plate 5. The light emitted from the light-converting unit is directly exited from the light guide plate 5, resulting in a small light-exiting angle, so that it is difficult to achieve a uniformity of the exiting light. Furthermore, a luminous efficiency of the backlight module is reduced, and the light entered into a left and right side faces of the backlight module directly exits from both the side faces to enter the surrounding environment, resulting in light leakage. As shown in FIG. 1, in the embodiment, a gap is provided between an outer wall 121 of the accommodating cavity 12 and an inner wall 61 of the blind hole 6. In this way, an air interface may be formed between the light-converting material 8 and the light guide plate 5, which meets a condition of the total reflection occurring to the light emitted from the light-converting material 8. Thus, the light emitted from the light-converting material 8 can be totally reflected at the interface between the gap and the outer wall 121 of the accommodating cavity, and the light emitted by the light-converting material 8 is totally reflected at the interface for multiple times, thereby enlarging a light-exiting angle of the light. Finally, the light exits from the light-exiting surface of the light guide plate 5 to achieve the uniform exiting light. In such manner, a utilization ratio of the light from the light-converting material 8 is improved, and the uniform exiting light is achieved.

Preferably, the interface between the gap and the outer wall 121 of the accommodating cavity is provided as a slope inclined by a predetermined angle relative to a bottom surface of the light guide plate. In other words, the outer wall 121 of the accommodating cavity is provided as an inclined surface. Due to the inclined surface, the light emitted by the light-converting material 8 is totally reflected for multiple times, and thus an angle of the light may be enlarged to achieve the uniform exiting light, thereby avoiding the problem of non-uniform exiting light in the related art caused by that the light is not totally reflected and directly exits at a small angle.

Figure 3:
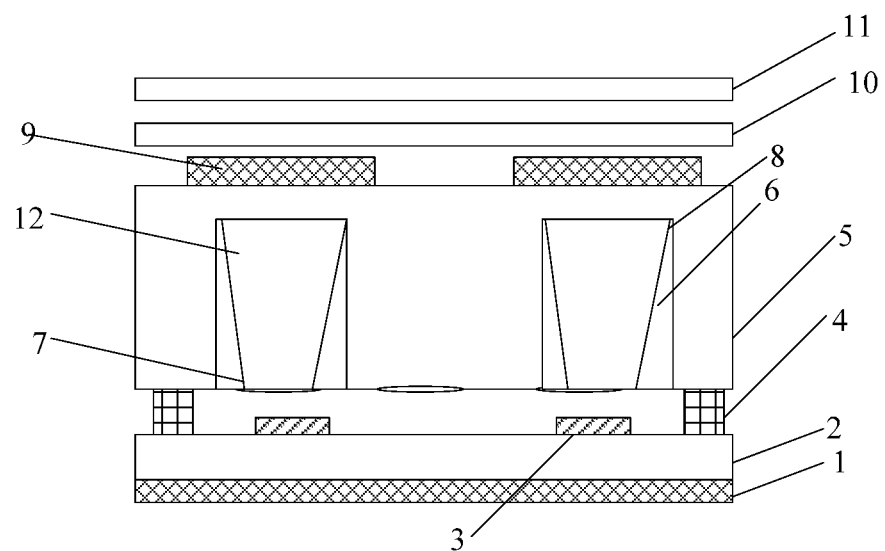
FIG. 3 is a schematic structural diagram of a backlight module according to at least one embodiment of the present disclosure.

The surface of the light guide plate 5 may be a light-exiting surface or a light-entering surface of the light guide plate 5. FIG. 1 shows that the plurality of blind holes 6 is arranged at the light-incident surface of the light guide plate 5. FIG. 3 shows that the plurality of blind holes 6 is arranged at the light-incident surface of the light guide plate 5. In implementation, a suitable surface can be selected according to actual situations. In some optional embodiments, the light-converting material 8 includes at least one of a quantum dot material and a fluorescent material. Optionally, the light-converting material 8 may also be made of other materials capable of emitting light under excitation of the other light.

Further, the plurality of blind holes 6 is arranged in an array at the surface of the light guide plate; a diameter of the blind hole 6 may be 100 μm to 1000 μm; a depth of the blind hole 6 may be 100 μm to 1000 μm, and a diameter of the accommodating cavity 12 needs to be smaller than the diameter of blind hole 6. Therefore, the diameter of the accommodating cavity 12 is smaller than 100 μm. In the case that parameters as above are applied, the luminous efficiency of the light-converting material 8 may be relatively high. The number of blind holes 6 can be set as needed. The greater the number of blind holes 6 is, the more light-converting materials filling the blind holes 6 are, and the higher a brightness enabled to be provided by the backlight module is, but a cost of manufacturing the backlight module is also increased. In actual applications, the number of blind holes 6 may be reasonably set according to actual requirements.

Figure 4:
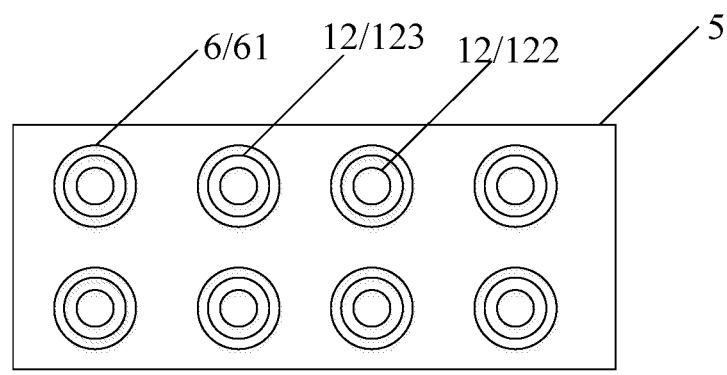
FIG. 4 is a top view of a light guide plate provided with blind holes and accommodating cavities according to at least one embodiment of the present disclosure.

Optionally, FIG. 4 is a top view of a light guide plate provided with blind holes and accommodating cavities. As shown in FIG. 4, the blind hole 6 is cylinder-like, and the accommodating cavity 12 is in a shape of truncated cone, which has a large diameter in the upper and a small diameter in the lower. According to an arrangement of the truncated cone-like, an arrangement of the inclined surface of the outer wall of the accommodating cavity is realized. Besides, the blind hole 6 may also be truncated cone-like.

In some optional embodiments, the light-transmitting material forming the accommodating cavity 12 may be a glass or a transparent resin. Of course, the light-transmitting material forming the accommodating cavity 12 is not limited to the glass or the transparent resin, and may be other colorless transparent materials.

Further, as shown in FIG. 1, a plurality of diffusion dots 7 is arranged on the light-entering surface of the light guide plate 5 facing away from the light-exiting surface. The diffusion dot 7 may reflect the light entering onto the light-entering surface from the light guide plate 5, so that the reflected light is mainly exiting from the light-exiting surface of the light guide plate, thereby improving the light utilization efficiency. In addition, the diffusion dot may realize the light diffusion function, which is beneficial to achieve the uniform exiting light.

As shown in FIG. 1, the backlight module is further provided according to the embodiment of the present disclosure, which includes the light guide plate 5. A plurality of blind holes 6 is arranged at the surface of the light guide plate 5. The blind hole 6 is filled with a light-converting unit. The light-converting unit includes an accommodating cavity 12 formed by a light-transmitting material, and a light-converting material 8 located in the accommodating cavity 12. The backlight module further includes the light source arranged on a side of the light-entering surface facing away from the surface of the light guide plate 5. The light source stimulates the light-converting material 8 to emit light.

In the embodiment, the plurality of blind holes 6 is arranged at the surface of the light guide plate 5, the blind hole 6 is filled with the light-converting unit, and the light-converting unit includes an accommodating cavity 12 made of a light-transmitting material, and the light-converting material 8 located in the accommodating cavity 12. In the case that a light source of the backlight module emits light, the light-converting material 8 may be excited to emit light, so that a wide color gamut of the backlight module may be realized. Moreover, directly packaging the light-converting material 8 inside the light guide plate 5 may save film materials, thereby contributing to lightening and thinning of the backlight module. Further, the gap is provided between an outer wall of the accommodating cavity 12 and an inner wall of the blind hole 6. In this way, the air interface may be formed between the light-converting material 8 and the light guide plate 5, so as to meet the condition that the light emitted from the light-converting material 8 is totally reflected. Thus, the light emitted from the light-converting material 8 can be totally reflected at the interface between the gap and the outer wall 121 of the accommodating cavity, so that the light emitted by the light-converting material 8 is totally reflected at the interface for several times, thereby enlarging the light-exiting angle of the light, improving a utilization ratio of the light from the light-converting material 8, and achieving the uniformity of the exiting light.

In some optional embodiments, the light-converting material 8 includes the quantum dot material and the fluorescent material. Optionally, the light-converting material 8 may also be formed by other materials capable of emitting light under excitation of the other light.

In some optional embodiments, the gap between the outer wall 121 of the accommodating cavity 12 and the inner wall 61 of the blind hole 6 may be filled with other media except the air gap, such as gas medium or liquid medium. A refractive index of the medium is smaller than the refractive index of a light-converting material to meet a total reflection occurring to the light emitted from the light-converting material 8 at the gap. The outer wall 121 of the accommodating cavity 12 is the inclined surface. In this way, the light emitted from the light-converting material 8 exits at a relatively large angle after the total reflection occurs at the gap for several times, which may improve the uniformity of the exiting light and avoid light leakage from the side of the accommodating cavity. In which, the larger an inclined angle of the outer wall 121 of the accommodating cavity 12 relative to the inner wall 61 of the blind hole 6 is, the better effect of the uniformity of the exiting light is.

After the light source is incident on the quantum dot material, an energy level transition occurs, so as to emit light having a wavelength greater than a wavelength of the light source. Optionally, the light source is blue light. After passing through the quantum dot material, the blue light radiates red light and green light, which form white light combined with a portion of the blue light exiting directly from the light-exiting surface of the light guide plate.

The plurality of blind holes 6 is arranged in an array on the surface of the light guide plate; a diameter of the blind hole 6 may be 100 μm to 1000 μm; a depth of the blind holes 6 may be 100 μm to 1000 μm, and a diameter of the accommodating cavity 12 needs to be smaller than the diameter of blind hole 6. Therefore, the diameter of the accommodating cavity 12 is less than 100 μm. In the case that parameters as above are applied, the light-emitting efficiency of the light-converting material 8 may be relatively high. The number of blind hole 6 can be set as needed. The greater the number of blind holes 6 is, the more the amount of light-converting materials filling the blind holes 6 is, and the higher a brightness enabled to be provided by the backlight module is, but a cost of manufacturing the backlight module is also increased. In actual applications, the number of blind holes 6 may be reasonably set according to actual requirements.

Optionally, the blind hole 6 may be in a shape of cylinder or truncated cone.

In some optional embodiments, the light-transmitting material forming the accommodating cavity 12 can be glass or a transparent resin. Of course, the light-transmitting material forming the accommodating cavity 12 is not limited to the glass or the transparent resin, and may be other colorless light-transmitting materials.

Further, as shown in FIG. 1, a plurality of diffusion dots 7 is arranged at the light-entering surface of the light guide plate 5 facing away from the surface of the light guide plate 5. The diffusion dot 7 may reflect the light incident on the light-entering surface from the light guide plate 5 to the light-entering surface, so that the reflected light mainly exits from the light-exiting surface of the light guide plate, thereby improving the light utilization efficiency. In addition, the diffusion dot may realize the light diffusion function, which is beneficial to achieve the uniform exiting light.

In some optional embodiments, the light source includes an LED (Light Emitting Diode) array 3 arranged on a transparent substrate 2. Each LED in the LED array 3 corresponds to at least one light-converting unit. The light source is packaged together with the light guide plate 5 by a packaging adhesive 4. It can be seen that, in the backlight module of the embodiment, the LEDs are arranged in direct-type, and different LEDs may be individually controlled to realize the dynamically adjustable backlight. Optionally, each LED is a blue LED.

As shown in FIG. 1, in some optional embodiments, the LED array 3 is arranged on the transparent substrate 2. A light reflecting layer 1 is arranged on a side of the transparent substrate facing away from the LED array 3. The light reflecting layer 1 may reflect the light exiting from the light-entering surface of the light guide plate 5, to enable the light to exit from the light-exiting surface of the light guide plate 5, thereby improving the utilization ratio of the light.

As shown in FIG. 1, in order to prevent from forming a bright spot because of a too bright light emitted from the light-converting material 8 in a vertical direction, a light-shielding metal pattern 9 shielding the light-converting unit is further arranged on the light-exiting surface of the light guide plate 5, to enable a light-emitting intensity at a corresponding position of the light-converting material 8 to be basically the same as a light-emitting intensity at the position where the light-converting material 8 is not arranged, thereby avoiding a local bright spot at the corresponding position of the light-converting material 8 and ensuring the uniformity of the exiting light.

In some optional embodiments, the backlight module further includes at least one of a scattering film 10 or a brightness enhancement film 11, which are located on a side of the light-shielding metal pattern 9 facing away from the light-exiting surface of the light guide plate 5.

During manufacturing the backlight module of the present disclosure, the process includes: forming the LED array 3 on the transparent substrate 2, packaging the LED array 3 and wires thereof on the transparent substrate 2, and performing laser drilling in the light guide plate 5. A hole at the light guide plate 5 is the blind hole 6 which is not a through hole. The diameter of the blind hole 6 is 100 μm to 1 mm, and the depth of the blind hole 6 is 100 μm to 1 mm. Specifically, the diameter and the depth of the blind hole 6 may be determined depending upon a light-emitting efficiency, a concentration, and a light-exiting efficiency of the light-converting material 8 in ink. Optionally, the cross-sectional shape of the blind hole 6 is cylinder-like.

The light-converting material 8 is mixed and assembled in a miniature glass cavity. The miniature glass cavity is packaged. A diameter of the miniature glass cavity is less than 100 μm. Of course, the miniature glass cavity may also be made of other transparent resin materials except the glass, as long as the individual packaging of the light-converting material 8 may be achieved. The miniature glass cavity can be cylinder-like or truncated cone-like.

The blind hole 6 on the light guide plate 5 is filled with the miniature glass cavity in which the light-converting material 8 is packaged, and the air interface is formed between the miniature glass cavity and the blind hole 6, thereby meeting the total reflection condition of the light guide plate 5 and finally achieving the uniformity of the exiting light. Then the light-shielding metal pattern 9, the scattering film 10, and the brightness enhancement film 11 may be sequentially formed on the light-exiting surface of the light guide plate 5 to complete manufacturing the backlight module.

A display device is further provided by an embodiment of the present disclosure, which includes the backlight module as described above. The display device may be any product or component having a display function, such as a liquid crystal television, a liquid crystal display, a digital photo frame, a mobile phone, a tablet computer, or the like. The display device also includes a flexible circuit board, a printed circuit board, or a backplane. Optionally, the liquid crystal display is a thin film transistor liquid crystal display (TFT-LCD).

Unless otherwise defined, technical terms or scientific terms used in the present disclosure should be interpreted according to common meanings thereof as commonly understood by those of ordinary skills in the art. Such terms as "first", "second" and the like used in the present disclosure do not represent any order, quantity or importance, but are merely used to distinguish different components. Such terms as "including", or "comprising" and the like mean that an element or an article preceding the term contains elements or items and equivalents thereof behind the term, but does not exclude other elements or items. Such terms as "connected", or "interconnected" and the like are not limited to physical or mechanical connections, but may include electrical connections, whether direct connection or indirect connection. Such terms as "on", "under", "left", "right" and the like are only used to represent a relative position relationship, and when an absolute position of a described object is changed, the relative position relationship thereof may also be changed accordingly.

It may be understood that when an element such as a layer, a film, a region or a substrate is referred to as being "on" or "under" another element, the element may be "directly" "on" or "under" the another element, or there may exist an intervening element.

The above embodiments are merely optional embodiments of the present disclosure. It should be noted that numerous improvements and modifications may be made by those skilled in the art without departing from the principle of the present disclosure, and these improvements and modifications shall also fall within the scope of the present disclosure.

What is claimed is:

1. A light guide plate, comprising: a light-entering surface, a light-exiting surface opposite to the light-entering surface, a plurality of blind holes arranged at the light-exiting surface of the light guide plate, and a light-converting unit arranged in each of the plurality of blind holes,
    wherein the light-converting unit comprises a container made of a light-transmitting material, and a light-converting material located in the container, and an air gap is between an outer wall of the container and an inner wall of each of the blind holes,
    wherein each of the blind holes is cylinder-like, and the outer wall of the container is an inclined surface.

2. The light guide plate according to claim 1, wherein the light-converting material comprises at least one of a quantum dot material and a fluorescent material.

3. The light guide plate according to claim 1, wherein a diameter of each blind hole is in a range of 100 μm to 1000 μm, a depth of each blind hole is in a range of 100 μm to 1000 μm, and a diameter of the accommodating container is smaller than 100 μm.

4. The light guide plate according to claim 1, wherein the light-transmitting material comprises a glass or a transparent resin.

5. The light guide plate according to claim 1, wherein the accommodating container is truncated cone-like.

6. The light guide plate according to claim 1, wherein a refractive index of a medium filled into the gap is less than a refractive index of the light-converting material.

7. The light guide plate according to claim 1, wherein the first surface is a light-exiting surface or a light-entering surface of the light guide plate.

8. A backlight module, comprising:
    a light guide plate, wherein the light guide plate comprises: a light-entering surface, a light-exiting surface opposite to the light-entering surface, a plurality of blind holes arranged at the light-exiting surface of the light guide plate, and a light-converting unit arranged in each of the plurality of blind holes, the light-converting unit comprises a container made of a light-transmitting material, and a light-converting material located in the container, and an air gap is between an outer wall of the container and an inner wall of each of the blind holes; and
    a light source arranged on a side of the light-entering surface of the light guide plate and configured to excite the light-converting material to emit light;
    wherein each of the blind holes is cylinder-like, and the outer wall of the container is an inclined surface.

9. The backlight module according to claim 8, wherein the light source comprises a LED (Light Emitting Diode) array, and each LED in the LED array corresponds to at least one light-converting unit.

10. The backlight module according to claim 9, wherein the LED array is arranged on a transparent substrate, and a light reflecting layer is arranged on a side of the transparent substrate facing away from the LED array.

11. The backlight module according to claim 10, wherein each LED in the LED array is a blue LED.

12. The backlight module according to claim 8, further comprising:
    a light-shielding metal pattern located on the first surface of the light guide plate, wherein an orthographic projection of the light-shielding metal pattern onto the first surface overlaps with an orthographic projection of the light-converting unit onto the first surface.

13. The backlight module according to claim 12, further comprising at least one of a scattering film and a brightness enhancement film,
wherein the scattering film and the brightness enhancement film are both located on a side of the light-shielding metal pattern facing away from the first surface of the light guide plate.

14. The backlight module according to claim 8, wherein the light-converting material comprises at least one of a quantum dot material and a fluorescent material.

15. The backlight module according to claim 8, wherein a diameter of each blind hole is in a range of 100 μm to 1000 μm, a depth of each blind hole is in a range of 100 μm to 1000 μm, and a diameter of the accommodating container is smaller than 100 μm.

16. The backlight module according to claim 8, wherein the light-transmitting material comprises a glass or a transparent resin;
the accommodating container is truncated cone-like;
a refractive index of a medium filled into the gap is less than a refractive index of the light-converting material.

17. A display device, comprising the backlight module according to claim 8.

* * * * *